United States Patent [19]

Chastonay

[11] Patent Number: 5,094,101
[45] Date of Patent: Mar. 10, 1992

[54] METHOD FOR DYNAMICALLY BALANCING GOLF CLUBS

[76] Inventor: Herman A. Chastonay, 6455 Potomac, St. Louis, Mo. 63139

[21] Appl. No.: 540,841

[22] Filed: Jun. 20, 1990

[51] Int. Cl.$^5$ .......................... G01M 1/38; A63B 53/00
[52] U.S. Cl. .......................................... 73/65; 273/77 A
[58] Field of Search ............................ 73/65; 273/77 A

[56] References Cited

U.S. PATENT DOCUMENTS

| | | | |
|---|---|---|---|
| 3,371,523 | 3/1968 | Crouch et al. | 73/65 |
| 3,698,239 | 10/1972 | Everett, III | 73/65 |
| 3,703,824 | 11/1972 | Osborne et al. | 73/65 |
| 3,871,649 | 3/1975 | Kilshaw | 273/77 A |
| 4,128,242 | 12/1978 | Elkins, Jr. | 273/77 A |
| 4,200,286 | 4/1980 | Bennett | 273/77 A |
| 4,203,598 | 5/1980 | Stuff et al. | 273/77 A |
| 4,280,700 | 7/1981 | Plagenhoef | 273/77 A |
| 4,415,156 | 11/1983 | Jorgensen | 273/77 A |
| 4,674,324 | 6/1987 | Benoit | 73/65 |

*Primary Examiner*—Charles A. Ruehl
*Attorney, Agent, or Firm*—Haverstock, Garrett & Roberts

[57] ABSTRACT

A method for dynamically balancing a plurality of golf clubs wherein each club in the plurality of clubs is balanced to the same radius of gyration, the present method being based upon the dynamic equations describing compound pendulum motion and inlcudes the following steps: selecting a reference club having a predetermined shaft or equivalent pendulum length and an inherent radius of gyration; determining the radius of gyration of the reference club; determining the shaft or equivalent pendulum length of each club in the plurality of clubs; determining the new anticipated center of gravity location for each club in the plurality of clubs based upon the corresponding shaft or equivalent pendulum length of each such club and the radius of gyration for the reference club; and balancing each of such clubs at its respective new anticipated center of gravity location. The present method optimizes and improves the feel, comfortability, performance and control characteristics of a particular plurality of golf clubs and enables a golfer to more accurately match the individual clubs in a particular set or other club grouping to his/her particular needs and preferences thereby producing a noticeable improvement in the uniformity of feed and swing control experienced by such golfer. A tool for use in determining the center of gravity location of each club to be balanced based upon a predetermined radius of gyration and the shaft or equivalent pendulum length of each such club is also disclosed.

20 Claims, 3 Drawing Sheets

*Prior Art*

Fig. 1

*Prior Art*

EXCERPT OF
"SWING LENGTH" TABLE
(Radius Of Gyration = 31.5)

| Shaft or Equivalent Pendulum Length ("l") (Inches) | New Anticipated Center Of Gravity Location ("r") (Inches From Grip End Of Club) |
|---|---|
| 35 | 28 3/8 |
| 35 1/8 | 28 1/4 |
| 35 1/4 | 28 1/8 |
| 35 3/8 | 28 |
| 35 1/2 | 27 15/16 |

Fig. 5

METHOD FOR DYNAMICALLY BALANCING GOLF CLUBS

The Present invention relates to a method for balancing golf clubs and, more particularly, to an improved method and apparatus for dynamically balancing such clubs wherein the radius of gyration is held constant for each golf club within a particular set of clubs. Since compound pendulum motion takes into account the important dynamic characteristics of balancing a golf club, and since radius of gyration, moment of inertia, the mass or weight of a particular golf club, the center of gravity location, and the shaft or pendulum length of a club are all interrelated in the dynamic equations describing compound pendulum motion, constant radius of gyration balancing provides for a more accurate dynamic balancing of such clubs as compared to other known balancing methods which are all tied to static parameters as will be hereinafter explained. Balancing a particular set of golf clubs to a particular radius of gyration, which radius of gyration value can be individually selected based upon a particular golfer's needs and preferences, enables all clubs so balanced to swing in marked similarity to each other regardless of the overall length of each individual club. This plays an important role in using the present golf clubs since most golfers have more difficulty in swinging and accurately controlling the longer irons and woods associated with any particular set of golf clubs.

BACKGROUND OF THE INVENTION

Any particular set of golf clubs includes a plurality of clubs each having a different club head weight, a different shaft length and, consequently, a different overall club weight. The combination of all of these factors requires a golfer to take a different stance and, in effect, a different swing when using each respective golf club. In order to be somewhat proficient at the game of golf, a golfer must therefore practice and attempt to master the various stances and swings associated with using any particular known set of golf clubs. As is well known, all golfers seem to have at least one Particular club within any given set which they feel more comfortable with in using and swinging and in which they can more accurately control when hitting any particular golf shot. In total contrast, golfers avoid using other clubs within the same set of golf clubs because they never seem to swing those other clubs Properly. Normally, golfers prefer using the shorter irons as proper use and control of these clubs are easier to achieve with some degree of regularity as compared to the longer irons and woods.

Golf clubs are available featuring a wide variety of variations in design and construction, all of which are directed to achieve any number of different desired results including improved performance and control. In this regard, a wide variety of methods for weighting and balancing golf clubs are known and have been utilized to some extent in an effort to overcome the inherent difficulty of using the longer irons and woods associated with a particular set of clubs thereby, hopefully, improving the Performance, control and handling characteristics of such clubs. For example, some of the known methods for individually balancing golf clubs include various swing weight balancing methods (see U.S. Pat. No(s). 3,371,523 and 4,203,598); matching moments of inertia, frequency of vibration, and adjusting flexural shaft rigidity (see U.S. Pat. No(s). 3,703,824 and 3,871,649); torque balancing a particular set of golf clubs wherein the inherent twisting moment of all such clubs is held constant (see U.S. Pat. No. 4,200,286); and weighting a particular golf club so as to take into account the various characteristics associated with club head mechanics (see U.S. Pat. No. 4,280,700). All of these weighting and balancing methods avoid and/or circumvent the dynamic characteristics of a golf club during a swinging or oscillating motion and all, in effect, represent a static balancing of such clubs. This is true even of the swing weight method disclosed in Benoit U.S. Pat. No. 4,674,324 wherein, although dynamic characteristics of golf clubs are discussed in relationship to moment of inertia and radius of gyration, the disclosed swing weight method of Benoit is still tied to static parameters since the resulting static moment associated with an individual golfer's optimum moment of inertia is then held constant for the entire set of golf clubs. Also, unlike the present method, the Benoit swing weight method specifically adjusts the radius of gyration for each individual golf club to optimize the feel and performance of such club. In fact, in the Benoit method, the radius of gyration is varied for each specific club so that the position of the center of percussion of each such club remains in the club head. This is totally different from the improved balancing method disclosed herein.

While the above-identified known weighting and balancing techniques attempt to take into account at least some of the dynamic characteristics associated with a golf club swing, none of the known prior art methods tie their methods, calculations and/or techniques to the true dynamic equations representative of the swinging motion of a golf club, nor do any of the known prior art methods hold the radius of gyration constant for all clubs in a particular set. The present method for weighting and balancing golf clubs relates the shaft or pendulum length of the club and its associated center of gravity location to the radius of gyration through the dynamic equations involving compound pendulum motion. This more accurately describes and simulates the dynamic characteristics associated with swinging a particular golf club and more accurately balances such golf clubs based upon both dynamic as well as static characteristics.

SUMMARY OF THE INVENTION

The present invention teaches both a method and the construction and operation of a tool for dynamically balancing a set of golf clubs such that the radius of gyration is held constant for all clubs comprising such set. The present method is based upon the assumption that any particular golf club, when free to rotate and swing under the influence of gravity about a fixed horizontal axis not passing through the center of gravity of such club, will move and swing as a compound pendulum. Since compound pendulum motion best simulates the oscillating motion of a golf club for dynamic balancing purposes, the dynamic equations for describing such motion are used in the present balancing method. Therefore, in accordance with the theory of dynamics of a rotating body, the compound pendulum length "1" equals the distance $K^2/r$, namely:

$$1 = K^2/r \qquad \text{(equation 1)}$$

where l = shaft or equivalent pendulum length of the club
K = radius of gyration of the club
r = distance between the pivot point or axis of rotation and the center of gravity of the club.

Figure 4:
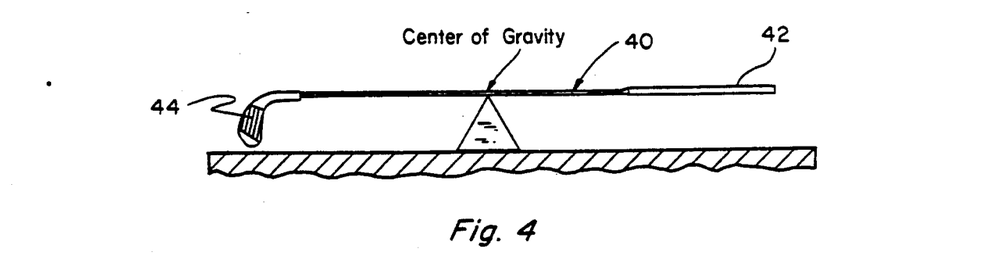
FIG. 4 is a side elevational view of a typical fulcrum device used to locate the center of gravity of a golf club along the shaft thereof.

The point on the compound pendulum located at the distance "$K^2/r$" from the axis of rotation is called the center of percussion. This means that the equivalent pendulum length is equal to the distance from the axis of rotation of the club to the center of percussion of the club. The center of percussion is a point, usually located on the club head, at which a free standing body can be struck so that the only motion imparted to the body is rotational motion around the body's axis of rotation or pivot point. This further means that since, in accordance with the dynamics of compound pendulum motion and the theory of the present method, the pivot point or axis of rotation of the club from which the distance "r" is measured is located at or substantially near the terminal or free end of the grip portion of the club, the equivalent pendulum length "l" in equation 1 above will be equal to the club shaft length as illustrated in FIG. 4. Equation 1 therefore ties the equivalent pendulum length of the club to the radius of gyration and to the distance between the axis of rotation and center of gravity of the club.

The radius of gyration of the mass of any particular body with respect to an axis is defined as that distance from the axis at which the entire mass of the body can be imagined to be concentrated and still have the same moment of inertia that the body has in its actually distributed form. This means that the radius of gyration can likewise be defined as follows:

$$I = K^2 m \qquad \text{(equation 2)}$$

where
I = moment of inertia
K = radius of gyration
m = mass or weight of the club Radius of gyration is therefore a component of the moment of inertia. Although, there is no particularly useful physical interpretation or meaning of a radius of gyration, it is a convenient means of expressing the moment of inertia of the mass of a body in terms of its mass and a length. Radius of gyration is therefore tied to and takes into account the important parameters for dynamically balancing any particular golf club as evidenced by equations 1 and 2 above.

Utilizing equations 1 and 2 above, one can calculate the radius of gyration of the reference club and, thereafter, holding such radius of gyration constant, calculate the new anticipated center of gravity associated with each of the other clubs based upon the selected radius of gyration value. Once the new center of gravity locations are calculated or otherwise determined, each club can be weighted and balanced about its new center of gravity location thereby producing a set of golf clubs weighted and balanced to the same radius of gyration.

The present method for dynamically balancing a particular set of golf clubs based upon a constant radius of gyration comprises the following steps:

(1) having a golfer select a reference golf club having all of the optimal parameters and performance characteristics for that particular golfer, such parameters including overall club weight, moment of inertia, center of percussion location and, most importantly, ease and comfortability with respect to swing, performance and control of that Particular club;

(2) through measuring, weighing and balancing, obtaining the shaft or equivalent pendulum length, the weight, and the center of gravity location of the reference club;

(3) using the dynamic pendulum motion equation, calculating the radius of gyration for the reference club;

(4) measuring the shaft or equivalent pendulum length of each club to be balanced to the radius of gyration of the reference club;

(5) using the dynamic pendulum motion equation, or the "swing length" table (FIG. 5) derived therefrom, or the present tool (FIGS. 8–11) as will be hereinafter described for calculating and/or locating the new center of gravity location for the club to be balanced based upon the selected radius of gyration of the reference club; and (6) balancing each such golf club in a conventional manner at its new center of gravity location based upon the selected radius of gyration.

It is anticipated and recognized that any number of selected clubs out of a particular set of golf clubs may be balanced in accordance with the present invention to a selected radius of gyration. For example, all of the irons in a particular set of golf clubs could be weighted and balanced to a specific radius of gyration whereas all of the woods in the same set of golf clubs could be weighted and balanced to a different radius of gyration. Other groupings of selected clubs out of a particular set of golf clubs could likewise be balanced to specific radius of gyration values, as desired.

The present invention discloses several alternative means for calculating and locating the new anticipated center of gravity location associated with the various golf clubs in a particular set. For example, the new anticipated center of gravity location associated with each individual golf club to be balanced can be calculated based upon a constant radius of gyration for such set using equations 1 and 2 set forth above. A table can then be formulated for each radius of gyration associating a specific club length with the corresponding center of gravity location for that specific radius of gyration. Each individual club can then be weighed and balanced for that constant radius of gyration at the corresponding center of gravity location. A plurality of tables can then be derived, each table corresponding to a specific radius of gyration.

The present invention also discloses the use of a tool which is specifically designed and calibrated to both measure the shaft or equivalent pendulum length of each specific golf club to be balanced to the selected radius of gyration value and, based upon the equivalent pendulum length so measured, identify and, when properly Positioned, locate the new anticipated center of gravity location on the club shaft. The present tool uses the dimension and location of the center of percussion of the respective club to designate a corresponding center of gravity for a dynamic balance of such club. The particular construction and operation of the present tool will be hereinafter more fully explained.

Regardless of which technique one uses to determine and locate the new anticipated center of gravity location for each respective golf club based upon a constant radius of gyration, the importance of the present invention lies in the fact that once a particular radius of gyration is selected, the dynamic equations for compound pendulum motion are used to correlate the shaft or equivalent pendulum length of each respective club to the new center of gravity location based upon the selected radius of gyration value. This produces a dynamically balanced set of golf clubs, each golf club being balanced to the same radius of gyration.

It is therefore a principal object of the present invention to provide a means for dynamically balancing a set of golf clubs.

Another object is to provide a method for balancing golf clubs wherein the radius of gyration is the same for each club so balanced.

Another object is to derive a table for each radius of gyration value selected, each table correlating the specific club or equivalent pendulum length to the center of gravity location associated with the selected radius of gyration value.

Another object is to teach the construction and operation of a tool which is calibrated to both measure the shaft or equivalent pendulum length of each respective club and to locate the new center of gravity location on such club shaft based upon the selected radius of gyration.

Another object is to teach a method for dynamically balancing a set of golf clubs wherein some of said plurality of golf clubs are balanced to one specific radius of gyration value and the remaining clubs in said set are balanced to another specific radius of gyration value.

Another object is to provide a method for optimizing and improving the feel and performance characteristics of a particular set of golf clubs.

Another object is to provide a method for dynamically balancing a set of golf clubs so as to more accurately match the individual clubs in a particular set so that all such clubs swing or "feel" alike.

These and other objects and advantages of the present invention will become apparent to those skilled in the art after considering the following detailed specification in conjunction with the accompanying drawings.

DETAILED DESCRIPTION OF THE INVENTION

Figure 1:
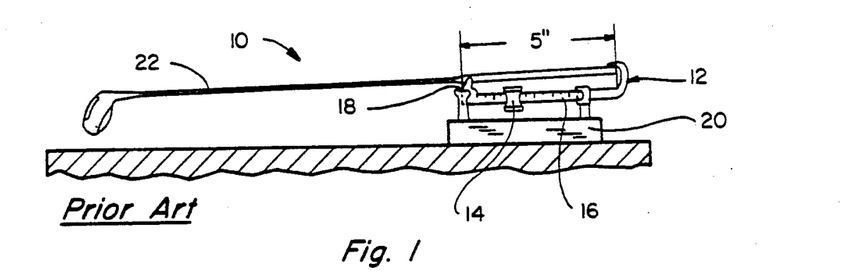
FIGS. 1 and 2 illustrate typical prior art swing-weight devices for balancing golf clubs.

Referring to the drawings more particularly by reference numbers wherein like numerals refer to like parts, number 10 in FIG. 1 identifies a standard prior art swing weight scale device commonly used to determine the swing weight of a particular golf club. The device 10 comprises a golf club holder 12, a weight-shifting mechanism 14, a calibrated scale 16, a pivot or fulcrum point 18, and a support base 20. A golf club 22 is positioned in the holder mechanism 12 and the weight mechanism 14 is manipulated from side-to-side until the golf club is balanced about its fulcrum or pivot point 18. The position of the weight 14 relative to the scale 16 is then observed to determine the swing weight for the club 22. The location of the fulcrum 18 is approximately 5 inches from the free end of the grip portion of the club 22. The swing weight device 10 can be constructed so that actual weight in ounces or grams can be read from the scale 16, or the scale can be calibrated in arbitrary figures. A detailed explanation of the operation of the prior art device 10 is disclosed in U.S. Pat. No. 4,203,598.

Figure 2:
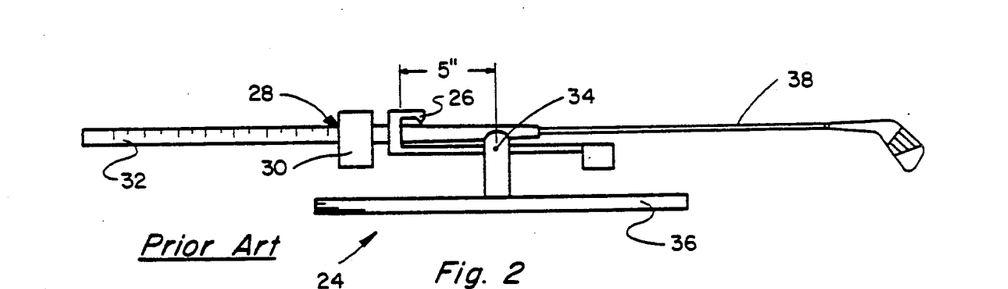

FIG. 2 discloses another prior art swing weight golf club balancing device 24. The prior art device 24 is disclosed in U.S. Pat. No. 4,674,324 and includes a golf club holder 26, a weight-shifting mechanism 28, a weight 30, a calibrated scale 32, a pivot or fulcrum point 34, and a base member 36. A golf club 38 is shown positioned in the holder 26 in preparation for balancing in accordance with the method disclosed in U.S. Pat. No. 4,674,324. Both of the above-identified prior art devices 10 and 24 swing weight balance a golf club about a fulcrum or pivot point which is located in all cases, for all clubs balanced on such prior art devices, at a fixed distance from the free end of the grip portion of the club shaft, namely, approximately 5 inches as illustrated in FIGS. 1 and 2. Other prior art balancing devices fix the fulcrum or pivot point at fixed distances such as 12 inches or 14 inches from the grip end portion of the club shaft. This is not true of the present method wherein each club is balanced about a new center of gravity location based upon a constant radius of gyration for each club comprising a particular set of golf clubs. This new anticipated center of gravity location will be different for each individual club in any particular set of clubs as will be hereinafter explained.

The first step in the present method for dynamically balancing a particular set of golf clubs involves having a golfer select a reference golf club having all of the optimal design parameters and performance characteristics important to that particular golfer. This selection of an ideal reference club involves a subjective evaluation on the part of the golfer in determining what performance and handling characteristics are important to that particular golfer, and what particular club construction "feels" and "performs" best for that golfer. The reference club selected should take into account all of the preferred factors and characteristics of the golfer including such parameters as the overall weight of the club, moment of inertia, center of percussion location, center of gravity location, preferred or optimal club length, the particular grip style and configuration preferred, and, most importantly, the ease, feel and comfortability with respect to swinging the reference club as well as its performance and control. An important part of this first step is to get sufficient data and feedback from the golfer to ensure that the proper reference club has been selected based upon all of the above-identified parameters. It has been the inventor's experience that the reference club will most likely be one of the shorter irons such as a seven iron since most golfers feel more comfortable with and prefer using and swinging the shorter irons as compared to the other clubs associated with any particular set. This is true because a majority of golfers tend to have problems hitting their longer clubs, namely, the woods and the longer irons, and therefore the shorter irons such as the seven iron usually provide the best or optimal feel and performance to the majority of golfers. Nevertheless, it is recognized that any club can be selected as the reference club depending upon the needs and preferences of the individual golfer. Regardless of which club is selected as the reference club, it is important to remember that the optimal feel, comfortability, performance and control of the reference club is critical to the present balancing method since the reference club establishes the radius of gyration value for all clubs to be balanced and the radius of gyration value is a critical factor in how a club feels and performs.

Figure 3:
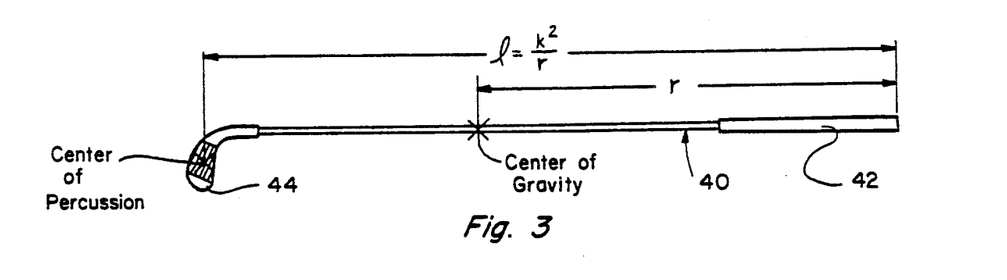
FIG. 3 is a side elevational view of a typical golf club identifying and illustrating the location of the various terms and parameters used in the present method for dynamically balancing a particular golf club.

Once the reference club has been selected in accordance with the guidelines set forth above, the reference club such as the club 40 illustrated in FIGS. 3 and 4 is measured and weighed to determine its mass or weight and its shaft or equivalent pendulum length. As illustrated in FIG. 3, the shaft or equivalent pendulum length is measured from the free end of the grip portion 42 to the center of percussion of the club head 44. Once the mass "m" and shaft length "1" have been determined, the reference club 40 is balanced on a conventional fulcrum type device as illustrated in FIG. 4 in order to locate the center of gravity position of the reference club. When so balanced, the center of gravity location is marked on the club shaft and the distance "r" (FIG. 3) from the center of gravity Position to the free end portion of the grip 42 is measured and determined. With respect to the selected reference club 40, we now know the mass "m" of the reference club, the shaft or equivalent pendulum length "1" of the reference club and, assuming that the axis of rotation for dynamic balancing purposes is located at the free end of the grip portion 42, the distance "r" between such axis of rotation and the center of gravity of the club. Using equation 1 as set forth above, the radius of gyration "K" can now be calculated for the reference club 40. Having determined the radius of gyration for the selected reference club, this radius of gyration value will now be the basis for balancing all of the remaining clubs in any particular set or other club grouping.

Figure 5:
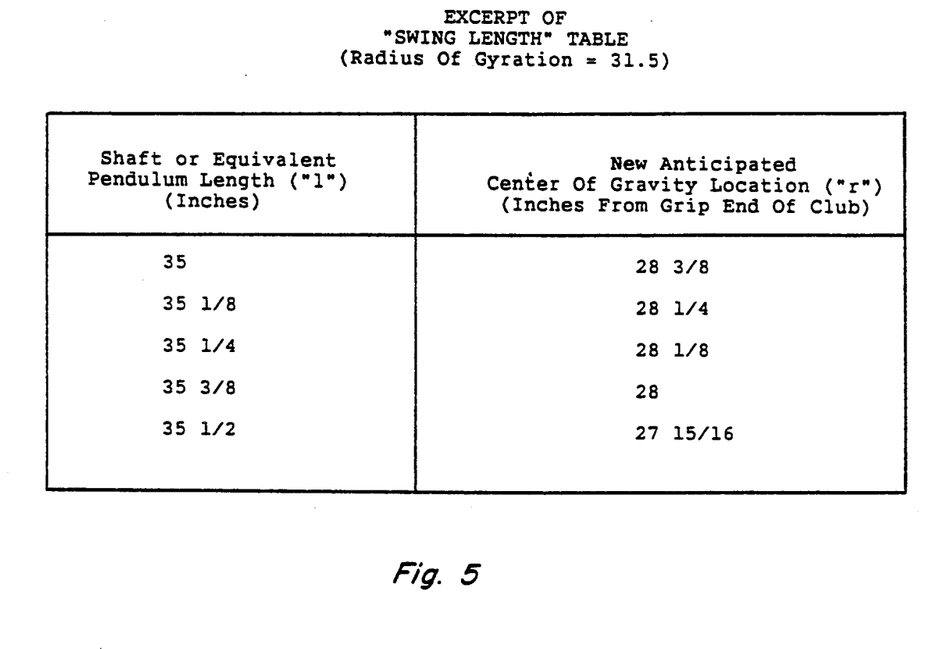
FIG. 5 is a table correlating the shaft or equivalent pendulum length to the new anticipated center of gravity location along such shaft length for a particular radius of gyration value.
Figure 6:
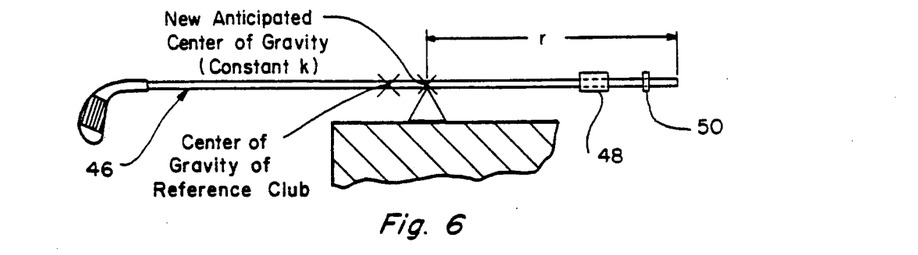
FIG. 6 is a side elevational view of a typical fulcrum device similar to FIG. 4 illustrating the weighting and balancing of a particular golf club at its new anticipated center of gravity location based upon a specific radius of gyration value.

The remaining clubs to be balanced can now be assembled and the shaft or equivalent pendulum length associated with each such club is measured as previously described with respect to the reference club 40. This now establishes the shaft or equivalent pendulum length "1" for each club to be balanced. Again, using equation 1 as set forth above, the distance "r" representing the distance between the free end portion of the club shaft (axis of rotation) and the new anticipated center of gravity of the club based upon the selected radius of gyration value determined for the reference club can now be calculated for each club to be balanced. Each such distance "r" as best shown in FIGS. 3 and 6 represents the new center of gravity location associated with each of the respective clubs about which location each such club will now be balanced in order to produce a set of clubs each having a radius of gyration equal to the radius of gyration determined for the reference club 40. Once the distance "r" values are calculated for each of the remaining clubs to be balanced, a table similar to the table illustrated in FIG. 5 can be derived and formulated correlating the shaft or pendulum length to the new anticipated center of gravity location. This table, which has been termed the "swing length" table, can be expanded to include a range of shaft or pendulum lengths ranging from the smallest possible shaft length to the largest possible shaft length associated with any particular golf club. Normally, shaft lengths range from 35-43 inches. However, it is important to remember that any such table developed such as the table illustrated in FIG. 5 is only applicable with respect to one specific radius of gyration value. Therefore, for each new radius of gyration value selected, a new "swing length" table correlating shaft length and the anticipated center of gravity location based upon the selected radius of gyration value will have to be formulated. It is therefore recognized and anticipated that a whole series of "swing length" tables could be developed covering a plurality of shaft length possibilities as well as a plurality of radius of gyration values. Having developed such a series of "swing length" tables, and upon selecting the appropriate radius of gyration value, a user could immediately refer to the appropriate "swing length" table for the selected radius of gyration value and, after measuring the shaft length of each club to be balanced as described above, quickly read the new anticipated center of gravity location for each such club.

Figure 7:
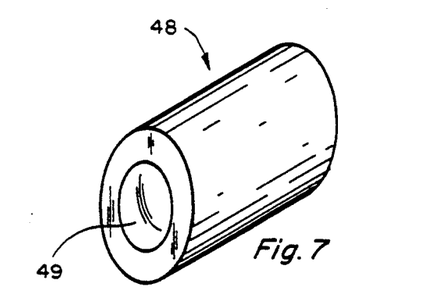
FIG. 7 is a perspective view of a cylindrical weight used in the present balancing process, said weight simulating the weight of a conventional grip associated with a particular golf club.

Each club to be balanced in accordance with the present invention is now balanced in a conventional manner at its new center of gravity location as calculated above and as illustrated in FIG. 6. Each such golf club such as the club 46 (FIG. 6) is balanced prior to attaching the particular grip member to the club. A cylindrical weight simulating the weight of the actual grip member to be ultimately attached to the club, such as the grip weight 48 having an opening 49 extending therethrough as illustrated in FIGS. 6 and 7, is slidably positioned on the club shaft at a Position approximating the center of mass of the actual grip member to be used. Typically, the cylindrical weight 48 is approximately 2 ounces in weight and is positioned approximately 4 inches from the free end of the club. It is recognized that the exact weight of any particular grip member as well as the exact center of mass associated therewith can be determined and the simulated grip weight 48 can be weighted and positioned on the club shaft in accordance with these exact determinations. It is important that the cylindrical weight 48 be positioned on the club shaft prior to balancing the same in order to take into account the weight of the grip member during the balancing process. Also, the weight 48 may be frictionally positioned and locked on the club shaft so as to remain fixedly located where positioned, or other suitable locking means (not shown) may be associated with the cylindrical weight 48 to accomplish this purpose.

With the cylindrical weight 48 attached to the club 46 and with the fulcrum device located at the new anticipated center of gravity location as illustrated in FIG. 6, additional trial weights such as the weight 50 (FIG. 6) are now added adjacent the grip end portion of the club in order to balance such club in equilibrium about the new anticipated center of gravity position. Once the club 46 is balanced as just described, a single permanent weight equal to the trial weight 50 or any equivalent weight arrangement is positioned and secured preferably inside the club shaft at the same location as the trial weight 50. The trial weight 50 is then removed and the balance of the club 46 with the permanent weight or weights secured thereto is then rechecked as illustrated in FIG. 6 to ensure that the club 46 has remained in balance. If, for any reason, the club 46 remains out of balance when the permanent weights are attached thereto, the above-identified balancing process is repeated until complete balance and equilibrium is achieved. At this point, the club 46 is dynamically balanced. The cylindrical weight 48 can now be removed and the actual grip member is positioned and secured to the outer periphery of the club shaft. Again, once the actual grip member is attached to the club, the balance of the club should again be rechecked as illustrated in FIG. 6 and, if necessary, rebalanced. It is also recognized that the permanent weights necessary to balance the club 46 to the selected radius of gyration value could likewise be incorporated into the grip member itself. Also, although, in most cases, the club 46 will be weighted towards the grip portion of the club, it is further recognized and anticipated that, in some cases, additional weights will have to be added towards the club head portion of the club in order to bring such club into balance about the new anticipated center of gravity location. In such event, the permanent weights needed to bring such club into balance will have to be manipulated and positioned to the proper position inside the club shaft.

Although the above method has been described with respect to a particular club 46, the present balancing method can be successively repeated for each club to be balanced in accordance with the techniques and teachings described above including the putter and all pitching wedge type clubs. When each individual club to be balanced has, in fact, been balanced about the new anticipated center of gravity location based upon the selected radius of gyration value, each such club will be dynamically balanced to the same radius of gyration. As previously explained, it is also recognized and anticipated that all of the irons associated with a particular set of golf clubs could be dynamically balanced to one radius of gyration value whereas all of the woods associated with the same set of clubs could be balanced to a different radius of gyration value, the reference club selected for the woods exhibiting different performance and feel characteristics as compared to the reference club selected for the irons. It is believed that dynamically balancing any plurality of clubs to the same radius of gyration results in improved swing feel and control for such set of clubs thereby producing a noticeable improvement in the uniformity of feel or swing experienced by the golfer.

FIGS. 8-11 illustrate the construction and operation of a tool 52 which is specifically designed and calibrated to both measure the shaft or pendulum length of each specific golf club to be balanced to a particular radius of gyration value and, based upon the shaft length so measured, identify and locate the new anticipated center of gravity location on that particular club shaft. In other words, use of the present tool member 52 circumvents the need to physically calculate the distance "r" as illustrated in FIGS. 3 and 6, which distance represents the distance from the free end portion of the club to the new anticipated center of gravity location, and it circumvents the need to use the "swing length" tables. The tool 52 takes into account the shaft length of the club; it automatically determines the distance "r" from the free end portion of the club to the new anticipated center of gravity location; and it provides means for physically locating and marking the new anticipated center of gravity location on the club shaft.

Figures 8, 11:
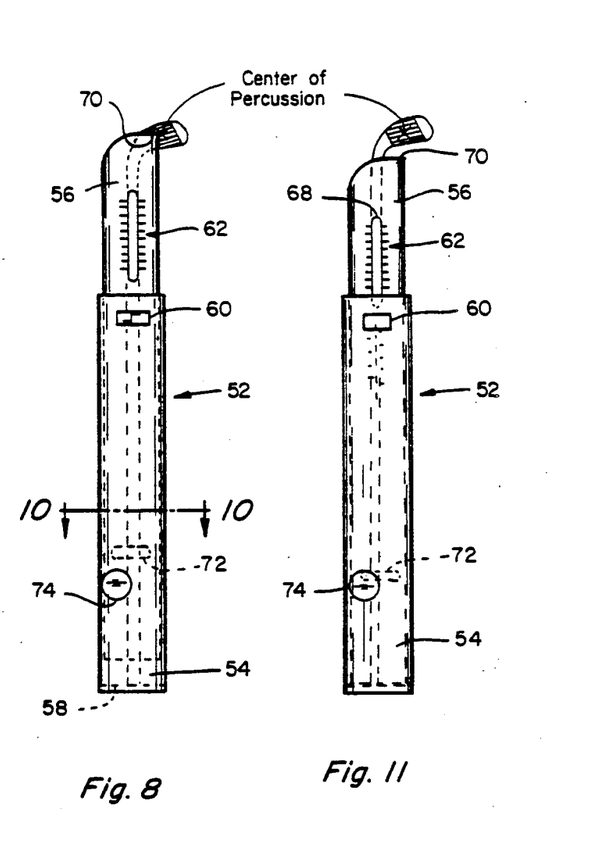
FIG. 8 is a front elevational view of the present tool member constructed according to the teachings of the present invention, the tool member being positioned and located adjacent a typical golf club for measuring the shaft or equivalent pendulum length of said club.
FIG. 11 is a front elevational view illustrating the positioning of the present tool member for identifying and locating the new anticipated center of gravity of a golf club along the shaft thereof for a selected radius of gyration value.
Figure 10:
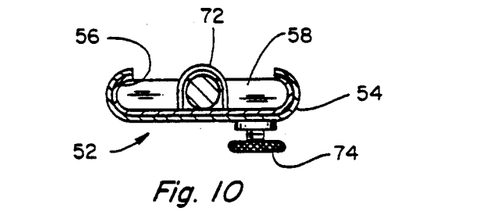
FIG. 10 is a cross-sectional view taken along the line 10—10 of FIG. 8.

The present tool member 52 comprises an extendible assembly including a base member 54 and a slide member 56, the members 54 and 56 being slidably movable relative to each other between a fully collapsed position wherein the bottom edge portion of the slide member 56 engages the bottom edge portion of the base member 54 as illustrated in FIG. 11 and an extended position as illustrated in FIG. 8. It is preferred that the members 54 and 56 be telescopically positioned one within the other as illustrated in FIGS. 8, 10 and 11 to facilitate construction and operation of the tool 52 as will be hereinafter explained, although other slidably movable arrangements of the members 54 and 56 could likewise be utilized. The base member 54 includes a flange portion 58 extending outwardly away from the bottom edge portion thereof as best illustrated in FIG. 10. The flange portion 58 serves as a stop means for engaging the free end portion of the club shaft. A window or opening 60 is located adjacent the opposite end portion of the member 54 for viewing a scale reading as will be hereinafter explained.

Figure 9:
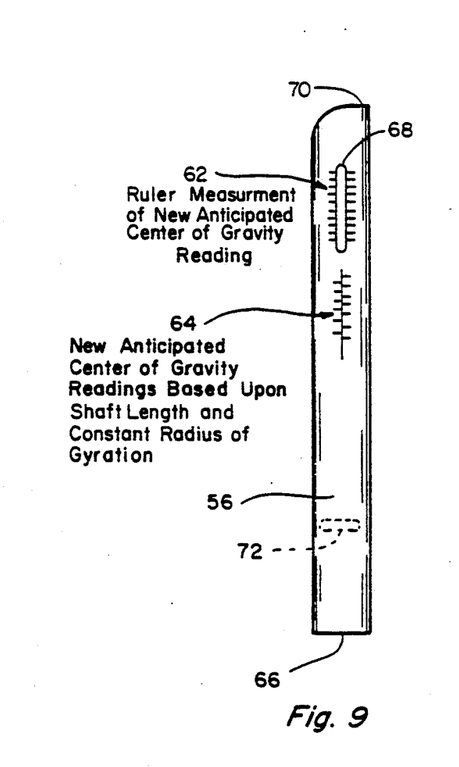
FIG. 9 is a front elevational view of the slide member associated with the tool member illustrated in FIG. 8.

The slide member 56 includes two graduated scales 62 and 64. The upper scale 62 simply functions as a ruler and provides means for measuring the total distance or length from the bottom edge portion 66 of the member 56 to the particular graduated marking associated with the scale 62. An elongated slot or opening 68 is centrally positioned extending the full length of the scale 62 as shown in FIGS. 8, 9 and 11. The scale 62 can be graduated on both sides of the elongated slot 68 and is preferably calibrated in inches, although other appropriate measurement units could be utilized if so desired. Importantly, the scale 62 is positioned and calibrated on the member 56 so as to correspond to the distance "r" previously calculated and set forth in the "swing length" tables such as the table illustrated in FIG. 5, the distance "r" defining the location of the new anticipated center of gravity from the free end portion of the club shaft. For example, if the new anticipated center of gravity location for a particular club is otherwise determined to be 28 inches from the free end portion of that respective club, then, with the bottom edge portion 66 of the slide member 56 positioned in abutment with the base flange 58 and adjacent the free end portion of the club as illustrated in FIG. 11, the 28 inch dimension could be read off of scale 62 and that dimension could be marked directly onto the club shaft at the designated dimension through the elongated slot 68.

In similar fashion, scale 64 is strategically positioned and placed on the slide member 56 such that when the tool 52 is oriented in an extended position as shown in FIG. 8, that is, with the free end portion of the club shaft resting upon the base flange 58 and the top edge portion 70 of the slide member 56 lying adjacent the center of percussion location on the club head, the window 60 of the member 54 will overlay and register with the proper dimension associated with the new anticipated center of gravity location for that particular club length. By orienting and extending the tool member 52 as shown in FIG. 8, the tool 52 is actually measuring the shaft or equivalent pendulum length of the club between the free end Portion of the club shaft and the center of percussion of the club head as previously explained and as shown in FIG. 3. Therefore, although a specific shaft length "1" dimension is not indicated or otherwise read directly off of the tool member 52, the shaft length "1" of the particular club under consideration is in fact measured and, based upon this dimension, the correct corresponding new anticipated center of gravity location is designated in window 60. As can be seen, it is important that the scale 64 be properly positioned and calibrated to the extendible positions of the slide member 56 relative to the base member 54 so that the selected range of shaft lengths "1" capable of being measured by the tool 52 corresponds respectively and will match up with the corresponding new anticipated center of gravity measurements on such scale when the tool 52 is extended to any particular shaft length dimension. For example, referring to the "swing length" table of FIG. 5, if the tool member 52 is positioned and extended adjacent a particular club to be balanced as illustrated in FIG. 8 and the overall distance between the free end portion of the club shaft and the center of percussion of the club head (shaft or equivalent pendulum length "1" ) is equal to 35 inches, then, for that particular shaft length of 35 inches, the window 60 should be so positioned and located as to overlay and register with the scale 64 such that the corresponding new anticipated center of gravity dimension of 28⅝ inches will appear in such window. This 28⅝ inch dimension in window 60 represents the location of the new anticipated center of gravity, the distance "r" illustrated in FIGS. 3 and 6, as measured from the free end portion of the club shaft.

Once the new anticipated center of gravity reading is obtained from window 60, the tool member 52 can be lowered to its fully collapsed position and oriented adjacent the club as illustrated in FIG. 11 with the free end portion of the club shaft resting upon the base flange 58. In its fully collapsed position, the center of gravity dimension obtained from window 60 can now be located on scale 62. In the example just illustrated, the dimension of 28⅝ inches is located on scale 62 and the club shaft is marked at such location through the slot 68. As previously explained, the scale 62 functions merely as a ruler type measuring device and identifies and locates the new anticipated center of gravity position at the proper distance from the free end portion of the club shaft. In this regard, it is important that the unit dimensions associated with the scale 64 be identical or compatible with the unit dimensions associated with the scale 62 for obvious reasons. Also, like scale 62, scale 64 can be graduated on both sides thereof as indicated in FIG. 9. It is also important to the construction of the present tool 52 that the scale 62 be visible and readable when the slide member 56 is oriented in its fully collapsed position as shown in FIG. 11. This can be accomplished by appropriately dimensioning the overall height or length of base member 54 as shown in FIG. 11, or, if the base member 54 overlays the scale 62 or any portion thereof when the tool is in its fully collapsed position, an appropriate window, opening or other means on the member 54 can be utilized to accomplish this end.

To facilitate the operation and use of the present tool 52, a ring member 72 as best illustrated in FIG. 10 is positioned at an intermediate location between the respective opposite ends of the slide member 56 for holding and retaining a golf club adjacent the tool member 52 during the measuring process. As illustrated in FIG. 10, the shaft of a particular club is inserted within the ring member 72 and this facilitates holding the tool 52 adjacent such club during the measuring process. Since the slide member 56 is movable and slidable relative to the base member 54, the ring member 72 should be sized sufficiently so as not to inhibit or otherwise interfere with the free movement of the slide member adjacent a club when the shaft of such club is inserted within the member 72. It is recognized that any plurality of ring members 72 may be utilized on the member 56 to further improve the stability and holding capability of the tool. Also, lock means such as the set screw arrangement 74 may likewise be utilized in order to lock and hold the slide member 56 in any position relative to the base member 54. This is particularly advantageous when positioning and orienting the tool member 52 in an extended position as illustrated in FIG. 8. The set screw 74 extends through the base member 54 and engages the slide member 56 as best shown in FIG. 10. As with the "swing length" tables discussed above and illustrated in FIG. 5, since the scales 62 and 64 correlate the shaft or pendulum length of the club to the new anticipated center of gravity location based upon a specific radius of gyration value, any one tool member 52 is only applicable with respect to one specific radius of gyration value. Therefore, like the "swing length" tables, for each new radius of gyration value selected, a new tool member must be constructed and calibrated correlating the shaft lengths and the anticipated center of gravity locations based upon the selected radius of gyration value. It is therefore also recognized and anticipated that a whole series of tool members such as the tool 52 could be developed and constructed covering a plurality of radius of gyration values.

Also, besides holding the radius of gyration constant for balancing any particular group of clubs, use of the present balancing method also enables one to likewise hold the moment of inertia of each such club constant, if so desired. Referring to equation 2 above, namely, $I = K^2 m$, it can be seen that if we hold the radius of gyration "K" constant, we can then change the moment of inertia of any particular club by simply changing its mass. If, after completing the present balancing method, the respective moments of inertia of all clubs so balanced to the same radius of gyration value are different, such moments of inertia could likewise be brought into uniformity by adding weight to each respective club at the new anticipated center of gravity location. Referencing FIG. 6, it can be seen that adding weight at the new anticipated center of gravity location will increase the overall weight or mass of the club and therefore, its moment of inertia, without changing its balance point or center of gravity location and, therefore, without changing its radius of gyration. By adding mass or weight at the new anticipated center of gravity location, any plurality of clubs could be dynamically balanced such that both the radius of gyration and the moment of inertia of each of said plurality of clubs are held constant. In addition, it is also anticipated and recognized that the specific mechanics involved in balancing any plurality of clubs in accordance with the present method on a fulcrum type device as illustrated in FIGS. 4 and 6 can be automated with the use of an automatically adjustable fulcrum or such balancing can be accomplished by any other suitable means.

Thus, there has been shown and described a novel method and apparatus for dynamically balancing golf clubs, which method and apparatus fulfill all of the objects and advantages sought therefor. Many changes, modifications, variations, and other uses and applications of the present method and apparatus will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A method for balancing a plurality of golf clubs, said method comprising the following steps:
   (a) having a golfer select a reference club having a predetermined shaft or equivalent pendulum length and an inherent radius of gyration;
   (b) determining the radius of gyration of the reference club;
   (c) determining the shaft or equivalent pendulum length of each of the clubs in said plurality of clubs;
   (d) determining the new anticipated center of gravity location for each of said plurality of clubs based upon the corresponding shaft or equivalent pendulum length associated respectively therewith and the radius of gyration determined for said reference club; and
   (e) balancing each of said plurality of clubs about its respective new anticipated center of gravity so as to give each of said clubs the same radius of gyration as the reference club.

2. The method of claim 1 wherein said reference club is an iron.

3. The method of claim 1 wherein said reference club is a wood.

4. The method of claim 1 further comprising the formulation of a table based upon the radius of gyration of the reference club, said table correlating the new anticipated center of gravity location determined for each of said plurality of clubs to the shaft or equivalent pendulum length associated respectively therewith.

5. The method of claim 4 wherein said table is expanded to include a plurality of additional shaft or equivalent pendulum lengths representative of a range of usable shaft lengths and the corresponding new anticipated center of gravity locations associated respectively with each such additional shaft or equivalent pendulum length added to said table.

6. The method of claim 5 including the formulation of a plurality of said tables, each of said tables being formulated for a different radius of gyration value.

7. The method of claim 1 further comprising the providing of a tool for affecting accomplishment of steps (c) and (d), said tool including means for correlating shaft or equivalent pendulum length with the new anticipated center of gravity location based upon the radius of gyration of the reference club.

8. An improved method for dynamically balancing a plurality of golf clubs wherein each of said plurality of clubs are balanced to the same radius of gyration, said method comprising the following steps:
   (a) selecting a predetermined radius of gyration value;
   (b) determining the shaft or equivalent pendulum length of each club in said plurality of clubs;
   (c) determining the new anticipated center of gravity location for each club in said plurality of clubs based upon the corresponding shaft or equivalent pendulum length associated respectively therewith and the selected radius of gyration value; and
   (d) balancing each of said clubs at its respective new anticipated center of gravity location.

9. The method of claim 8 further comprising the following additional steps:
   (a) selecting a predetermined moment of inertia value; and
   (b) balancing at least some of said plurality of clubs to the predetermined moment of inertia value by adding a predetermined amount of weight to each of said clubs respectively at the new anticipated center of gravity location determined for each such club so as not to change the radius of gyration associated respectively therewith.

10. An apparatus for determining the center of gravity location of a golf club based upon a predetermined radius of gyration, said apparatus comprising means for determining the shaft length of said golf club, said shaft length being defined as the distance between the free end portion of said club and the center of percussion thereof, and means for determining the center of gravity location of said golf club based upon said predetermined radius of gyration and said shaft length.

11. The apparatus of claim 10 including means for locating said center of gravity location on said club shaft relative to the free end portion thereof.

12. The apparatus of claim 10 wherein said means for determining the shaft length of said golf club includes first and second members, said first and second members being slidably movable relative to each other between a first condition wherein said members are in an elongated extended condition and a second condition wherein said members are fully collapsed relative to each other, said first and second members being capable of extending between the free end portion of said golf club and the center of Percussion thereof when in their elongated extended position.

13. The apparatus of claim 10 wherein said means for determining the center of gravity location of said golf club includes a first calibrated scale.

14. The apparatus of claim 11 wherein said means for locating the center of gravity location on said club shaft includes a second calibrated scale.

15. The apparatus of claim 12 including means associated with one of said first and second members for holding and maintaining said members in an extended position.

16. The apparatus of claim 12 wherein one of said first and second members includes a flange portion associated with one end portion thereof, said flange portion serving as stop means for engaging the free end portion of said club when said apparatus is Positioned adjacent thereto.

17. The apparatus of claim 12 including means associated with one of said first and second members for holding and retaining said golf club adjacent said apparatus during use thereof.

18. A tool for use in determining the center of gravity location of a golf club having a shaft, a grip portion and a club head, said center of gravity location being based upon the shaft length of said golf club and a predetermined radius of gyration, said shaft length being defined as the distance between the free end of said grip portion and the center of percussion of said club head, said tool comprising an extendible assembly including first and second members, said first and second members being slidably movable relative to each other between a first fully collapsed position and a second extended position wherein said members are extendable between at least the free end of said grip portion and the center of percussion of said club head, a first calibrated scale on one of said first and second members for determining the center of gravity location of said club when said tool is extended between the free end of said grip portion and he center of percussion of said club head, a second calibrated scale associated with one of said first and second members for locating the center of gravity location on said club shaft relative to the free end of said grip portion, said second calibrated scale including means for enabling one to mark said club shaft at the appropriate designated location on said second scale when said tool is positioned adjacent said club.

19. The tool of claim 18 wherein said means associated with said second calibrated scale for enabling one to mark the center of gravity location on said club shaft includes an elongated opening centrally positioned extending the full length of said second calibrated scale.

20. A plurality of golf clubs each comprising a club shaft, a grip and a club head, each club in said plurality of clubs being balanced about a center of gravity location on said club shaft such that all of said clubs have the same radius of gyration, said center of gravity location for each respective club being based upon the equivalent pendulum length associated with each respective club and said radius of gyration value, said equivalent pendulum length being defined as the distance between the free end portion of the grip associated with each of said plurality of clubs and the center of percussion associated with each respective club head.

* * * * *

UNITED STATES PATENT AND TRADEMARK OFFICE
CERTIFICATE OF CORRECTION

PATENT NO. : 5,094,101

DATED : March 10, 1992

INVENTOR(S) : Herman A. Chastonay

It is certified that error appears in the above—identified patent and that said Letters Patent is hereby corrected as shown below:

On the Title page, item [57]
In the Abstract, line 5, "inlcudes" should be --includes--.

Column 1, line 43, "Particular" should be --particular--.

Column 1, line 49, "Properly" should be --properly--.

Column 1, line 63, "Performance" should be --performance--.

Column 3 line 68, "Particular" should be --particular--.

Column 4, line 53, "Positioned" should be --positioned--.

Column 6, line 18, "Positioned" should be --positioned--.

Column 6, line 47, "Pivot Point" should be --pivot point--.

Column 6, line 49, "Present" should be --present--.

Column 6, line 59, "Performance" should be --performance--.

UNITED STATES PATENT AND TRADEMARK OFFICE
CERTIFICATE OF CORRECTION

PATENT NO. : 5,094,101

DATED : March 10, 1992

INVENTOR(S) : Herman A. Chastonay

It is certified that error appears in the above-identified patent and that said Letters Patent is hereby corrected as shown below:

```
Column 7, line 45, "Position" should be --position--.

Column 8, line 49, "Position" should be --position--.

Column 10, line 47, "Previously" should be --previously--.

Column 10, line 62, "Placed" should be --placed--.

Column 11, line 6, "Portion" should be --portion--.

Column 14, line 42, "Percussion" should be --percussion--.

Column 14, line 58, "Positioned" should be --positioned--.

Column 15, line 14  "he" should be --the--.
```

Signed and Sealed this

Twenty-fifth Day of May, 1993

Attest:

MICHAEL K. KIRK

Attesting Officer  Acting Commissioner of Patents and Trademarks